(12) United States Patent
Sears et al.

(10) Patent No.: US 9,719,521 B2
(45) Date of Patent: Aug. 1, 2017

(54) FLUID INTENSIFIER FOR A DRY GAS SEAL SYSTEM

(71) Applicants: John Sears, Calgary (CA); Vladimir Bakalchuk, Skokie, IL (US); Luis Figueroa, Calgary (CA)

(72) Inventors: John Sears, Calgary (CA); Vladimir Bakalchuk, Skokie, IL (US); Luis Figueroa, Calgary (CA)

(73) Assignee: Flowserve Management Company, Irving, TX (US)

( * ) Notice: Subject to any disclaimer, the term of this patent is extended or adjusted under 35 U.S.C. 154(b) by 128 days.

(21) Appl. No.: 13/920,346

(22) Filed: Jun. 18, 2013

(65) Prior Publication Data
US 2014/0150421 A1 Jun. 5, 2014

Related U.S. Application Data

(60) Provisional application No. 61/660,931, filed on Jun. 18, 2012.

(51) Int. Cl.
F04D 29/10 (2006.01)
F16J 15/00 (2006.01)
F15B 3/00 (2006.01)

(52) U.S. Cl.
CPC ............... F04D 29/10 (2013.01); F15B 3/00 (2013.01); F16J 15/00 (2013.01)

(58) Field of Classification Search
CPC .. F15B 9/03; F15B 3/00; F04B 9/1256; F04B 9/125; F04B 9/12; F04B 49/065; F04B 49/22; F04D 29/10; F16J 15/00
(Continued)

(56) References Cited

U.S. PATENT DOCUMENTS 2,569,881 A 10/1951 Davies
3,234,833 A 2/1966 Douglas
(Continued)

FOREIGN PATENT DOCUMENTS

EP 0107894 1/1990

OTHER PUBLICATIONS

Trinkel, Bud. Pressure intensifier circuits. Hydraulics and Pneumatics, Book2, Chapter 13, Apr. 13, 2009. [online] [retrieved May 14, 2010] Retrieved from the Internet <URL http://hydraulicspneumatics.com/other-technologies/book-2-chapter-13-pressureintensifier-circuits>.*

(Continued)

*Primary Examiner* — Edelmira Bosques
*Assistant Examiner* — Richard Drake
(74) *Attorney, Agent, or Firm* — Miller Canfield Paddock and Stone; Mark L Maki

(57) ABSTRACT

A gas supply system for a mechanical seal turns on the gas supply at a pressurized flow rate at the time of compressor case pressurization and remains on during compressor rotation until pressure is adequate. The gas supply system has an intensifier that includes a pair of mechanically inter-connected pneumatic pressure cylinders which comprise a drive cylinder that affects movement of a boost cylinder wherein the displacement of these mechanically interconnected pistons in the drive cylinder and boost cylinder intensifies the pressure being discharged by the boost cylinder and supplied as a barrier fluid to the mechanical seal. The intensifier uses a control valve and operating system which includes a fast-acting 5/2-way solenoid valve having a feedback loop connected to a control system which includes a microprocessor that controls valve actuation.

10 Claims, 6 Drawing Sheets

(58) Field of Classification Search
USPC .......................................................... 91/275
See application file for complete search history.

(56) References Cited

U.S. PATENT DOCUMENTS

| | | | |
|---|---|---|---|
| 3,234,885 | A | 2/1966 | Douglas |
| 4,523,895 | A | 6/1985 | Silva |
| 4,905,962 | A * | 3/1990 | Iljin .................... 251/129.16 |
| 5,060,762 | A | 10/1991 | White |
| 5,336,052 | A | 8/1994 | Zollner |
| 5,606,993 | A | 3/1997 | Stoll |
| 6,221,332 | B1 | 4/2001 | Thumm |
| 6,328,542 | B1 | 12/2001 | Serafin |
| 6,342,090 | B1 | 1/2002 | Cao |
| 6,558,134 | B2 | 5/2003 | Serafin |
| 6,827,479 | B1 | 12/2004 | Xia |
| 7,168,464 | B2 | 1/2007 | Diggins |
| 7,316,363 | B2 | 1/2008 | Hume |
| 2001/0017445 | A1 | 8/2001 | Hall et al. |
| 2003/0118459 | A1* | 6/2003 | Gerhardt et al. ............ 417/390 |
| 2007/0266846 | A1* | 11/2007 | Simmons et al. ............ 91/218 |
| 2007/0295697 | A1 | 12/2007 | Braun |
| 2008/0105316 | A1 | 5/2008 | Serafin |
| 2010/0089063 | A1* | 4/2010 | McBride et al. ............ 60/682 |
| 2010/0307156 | A1 | 12/2010 | Bollinger et al. |
| 2011/0225961 | A1 | 9/2011 | McCrary |
| 2015/0361970 | A1* | 12/2015 | White ................ F04B 25/00 417/53 |

OTHER PUBLICATIONS

Hanson, Neal. Selecting Proportional Valves and High Response Valves. [electronic presentation] Presented Apr. 13-14, 2010 as Technical Session: Hydraulic Proportional and Servo Technologies. [retrieved May 15, 2015] retrieved from Internet <URL http://www.cmafh.com/enewsletter/ENews%20editions/DFTthankyou_eNewsletter_2010.html>.*

The International Search Report and Written Opinion of the International Searching Authority for PCT/US2013/046256, date completed Nov. 12, 2013, date mailed Nov. 26, 2013.

Book 2, Chapter 13, Pressure Intensifier Circuits. Hydraulics & Pneumatics, Apr. 12, 2009, retrieved from the Internet, http://hydraulicspneumatics.com/other-technologies/book-2-chapter-13-pressure-intensifier-circuits.

* cited by examiner

FLUID INTENSIFIER FOR A DRY GAS SEAL SYSTEM

CROSS REFERENCE TO RELATED APPLICATIONS

This application asserts priority from provisional application 61/660,931, filed on Jun. 18, 2012, which is incorporated herein by reference.

FIELD OF THE INVENTION

The invention relates to mechanical seal system having a fluid intensifier for a dry gas seal system which supplies gas to a mechanical seal and more particularly, to a gas seal system having an improved intensifier which supplies barrier fluid to the mechanical seal.

BACKGROUND OF THE INVENTION

In conventional mechanical seal configurations, various types of rotating equipment, such as pumps and compressors, are provided with mechanical seals to prevent or impede leakage of process fluid that might otherwise migrate along the shaft of the rotating equipment. In many of these mechanical seals, a dry gas serves as a barrier fluid or buffer fluid next to a pair of relatively rotatable mechanical seal rings, which fluid serves to greatly minimize, if not eliminate leakage along the shaft. Such mechanical seals include a barrier fluid chamber for receiving the dry gas therein from a gas supply system. This gas supply system supplies the gas to the mechanical seal at a particular pressure and flow rate which maintains an adequate supply within the fluid chamber of the seal.

During normal conditions, leakage of process fluid past the seal faces into the barrier fluid chamber is prevented by the higher pressure of the barrier fluid both statically when the shaft is not rotating and dynamically during shaft rotation. Under such normal conditions, small amounts of barrier fluid may flow across the seal faces into the process fluid, although this barrier fluid is of a type of fluid which is not a contaminant if present in the process fluid. However, if inadequate barrier fluid pressure is present, a reverse flow of process fluid may occur where the process fluid undesirably leaks into the barrier fluid chamber. For example, in a compressor, there may be a period when the compressor is being started or is being shutdown, and during these periods, there may not be adequate barrier fluid pressure and flow to prevent a reverse flow of process fluid leaking into the barrier fluid chamber.

It is an object of the invention to maintain an adequate flow rate of the barrier fluid, even at low-feed operating conditions of the rotating equipment or at start up of such equipment.

The invention relates to an improved gas supply system which, in particular, relates to an improvement in a gas supply system sold by the assignee of the present application under the trademark AMPLIFLOW™. In the known AMPLIFLOW system, the seal supply system turns on the gas supply at a pressurized flow rate at the time of, for example, compressor case pressurization wherein the seal supply system remains on during compressor rotation. At the point in time when pressure is adequate, the AMPLIFLOW system can be turned off while the compressor system continues running. During unit shutdown of the compressor system, the AMPLIFLOW system may be turned on again as compressor rotation comes to a stop and after rotation is completed, then the AMPLIFLOW system can be turned off again.

More particularly as to the present invention, the invention relates to an improved supply system having an intensifier comprising a pair of mechanically inter-connected pneumatic pressure cylinders which comprise a drive cylinder that affects movement of a boost cylinder wherein the displacement of these mechanically interconnected pistons in the drive cylinder and boost cylinder intensifies the pressure being discharged by the boost cylinder and supplied as a barrier fluid to the mechanical seal.

While a pneumatic four-way valve has been used in the known AMPLIFLOW system to control the operation of the drive cylinder, this pneumatic four-way valve, as shown in FIGS. 3-5 of the present application suffers from disadvantages associated therewith as discussed in more detail herein.

The invention relates to an improved intensifier using an improved control valve and operating system therefore which provides advantages over the prior art. In this regard, the invention relates to an intensifier using a fast-acting 5/2-way solenoid valve having a feed back loop connected to a control system which includes a micro processor that controls valve actuation. As discussed herein, this system provides for remote operation and monitoring and improves the overall performance of the fluid control system.

Other objects and purposes of the invention, and variations thereof, will be apparent upon reading the following specification and inspecting the accompanying drawings.

Figure 1:
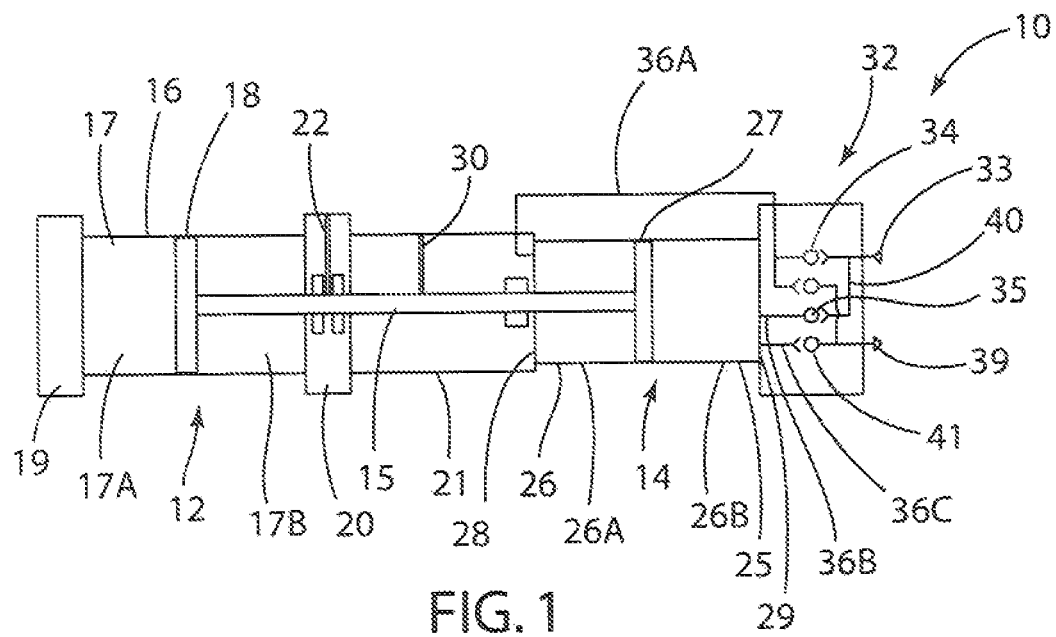
FIG. 1 is a diagrammatic view illustrating a dual-piston intensifier of a gas-supply system of the invention in a first operative condition.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
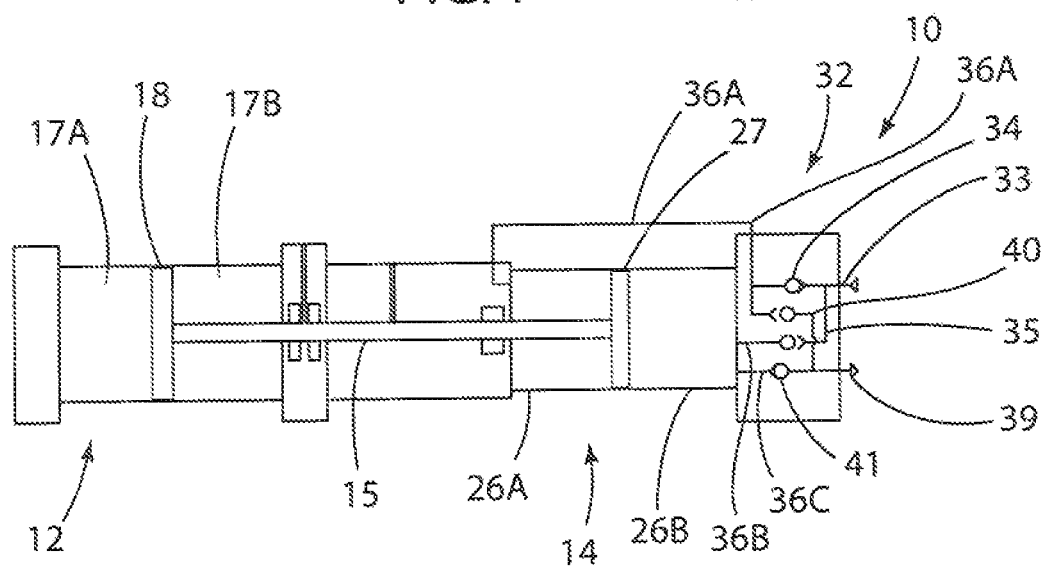
FIG. 2 illustrates a second operative condition of the intensifier of the invention.

Referring to FIGS. 1 and 2, an intensifier 10 of the invention is shown without the control system therefore. The intensifier 10 is a system of pressurized pneumatic cylinders which are operatively connected together to boost or increase the pressure of the barrier fluid gas being discharged from the intensifier 10 and being supplied to the barrier fluid chamber of a mechanical seal.

More particularly, the intensifier 10 includes a drive cylinder 12 which is operatively connected to a boost cylinder 14 by an intermediate piston rod 15. The drive cylinder 12 has a pressurized cylinder housing 16 which defines a pressure chamber 17 that is subdivided into variable-volume cylinder chambers 17A and 17B by a reciprocating piston 18. The cylinder housing 16 includes end walls 19 and 20 wherein the piston rod 15 slidably passes through the end wall 20 and through a spacer-like distance piece 21 for connection to the boost cylinder 14.

As described in further detail below, the chambers 17A and 17B of the drive cylinder 12 are alternately pressurized and depressurized by an air source to drive the piston 18 in opposite leftward and rightward directions and effect a corresponding driving of the boost cylinder 14. Generally, an air vent 22 is provided to release air leaking from chamber 17B during rightward movement of the piston 18 which may occur as the chamber 17A is pressurized by the air source and the piston 18 is driven rightwardly.

As seen in FIG. 1, the boost cylinder 14 has a pressurized cylinder housing 25 which defines a pressure chamber 26 that is subdivided into variable-volume cylinder chambers 26A and 26B by a reciprocating piston 27. The cylinder housing 25 includes end walls 28 and 29 wherein the piston rod 15 slidably passes through the end wall 28 from the distance piece 21 so as to be driven by the drive cylinder 12 described above.

As the chambers 17A and 17B of the drive cylinder 12 are alternately pressurized and depressurized by the air source, the drive piston 18 reciprocates in opposite leftward and rightward directions and affects a corresponding leftward and rightward driving of the boost cylinder 14. Generally, a gas vent 30 is provided to release barrier gas pressure leaking from chamber 26A during leftward movement of the piston 27 which occurs as the piston 27 moves leftwardly.

With this arrangement, the drive cylinder 12 is linked mechanically to the boost cylinder 14. The diametric area of each piston 18 and 27 differs wherein the area of the piston 18 is larger than the area of the piston 27. As such, the air pressure driving the drive cylinder 12 boosts or increases the pressure generated in the boost cylinder 14 and being output therefrom for supplying the mechanical seal with barrier fluid.

To control the discharge of barrier fluid being discharged from the boost cylinder 14, a valve system 32 is provided to ensure a continuous, pressurized flow of barrier gas during the reciprocating movement of the drive cylinder 12. The valve system 32 includes a gas inlet 33 that receives a dry gas as the barrier fluid from a gas supply. The gas inlet 33 includes supply lines that split and feed a normally-open first check valve 34 and a normally-closed second check valve 35. The normally-open first check valve 34 and the normally-closed second check valve 35 respectively connect to a first supply line 36A that is connected to the cylinder chamber 26A and connect to a second supply line 36B that is connected to the cylinder chamber 26B. The supply lines 36A and 36B alternatively can be referenced as inlet lines for supplying the barrier fluid alternatingly to the chambers 36A and 36B during operation of the intensifier or as discharge lines when discharging fluid from the chambers 36A and 36B.

The valve system 32 also includes a gas outlet or discharge 39 that discharges the dry gas as the barrier fluid to the barrier fluid chamber of the mechanical seal. The gas discharge 39 includes discharge lines that split and receive buffer fluid from a normally-closed third check valve 40 and a normally-open fourth check valve 41. The normally-closed third check valve 40 and the normally-open fourth check valve 41 respectively connect to the first supply line 36A that is connected to the cylinder chamber 26A and connect to a third supply line 36C that is connected to the cylinder chamber 26B.

The various check valves 34, 35, 40 and 41 are automatically switchable between open and closed conditions depending upon whether the supply lines 36A, 36B or 36C are subjected to gas pressure during reciprocating movement of the boost piston 27.

For example, FIG. 1 shows a first operative condition wherein the boost cylinder 14 is pressurized by the drive cylinder 12 in the rightward direction, and wherein the drive piston 18 is moved rightwardly by air pressurization of the chamber 17A which drives the piston 18 rightwardly. This drives the boost piston 27 rightwardly and pressurizes or compresses the gas in the chamber 26B. In this condition, fourth valve 41 is open to allow compressed gas to be discharged through supply line 36C and gas discharge 39, while the incoming supply line 36B is blocked by closed check valve 35. At the same time, first check valve 34 is open and third check valve 40 is closed which allows the inlet gas to refill the expanding cylinder chamber 26A. Hence, during rightward movement of the piston 27, gas is compressed and discharged from the discharge port 39 to the mechanical seal.

In the second operative condition of FIG. 2, the boost cylinder 14 is pressurized by the drive cylinder 12 in the leftward direction, wherein the drive piston 18 is moved leftwardly by air pressurization of the chamber 17B which drives the piston 18 leftwardly. This drives the boost piston 27 leftwardly and pressurizes or compresses the gas in the chamber 26A. In this condition, third valve 40 is open to allow compressed gas to be discharged through supply line 36A and gas discharge 39, while incoming gas to this supply line 36A is blocked by closed check valve 34. At the same time, second check valve 35 is open and fourth check valve 41 is closed which allows the inlet gas to refill the expanding cylinder chamber 26B. Hence, during leftward movement of the boost piston 27, gas is compressed in chamber 26A and discharged from the discharge port 39 to the mechanical seal. Since one of the chambers 26A and 26B is being pressurized at any time depending upon the direction of movement of the boost piston 27, the gas is continuously discharged from the gas discharge 39 so that a continuous, pressurized supply of barrier gas is supplied to the mechanical seal.

Figure 3:
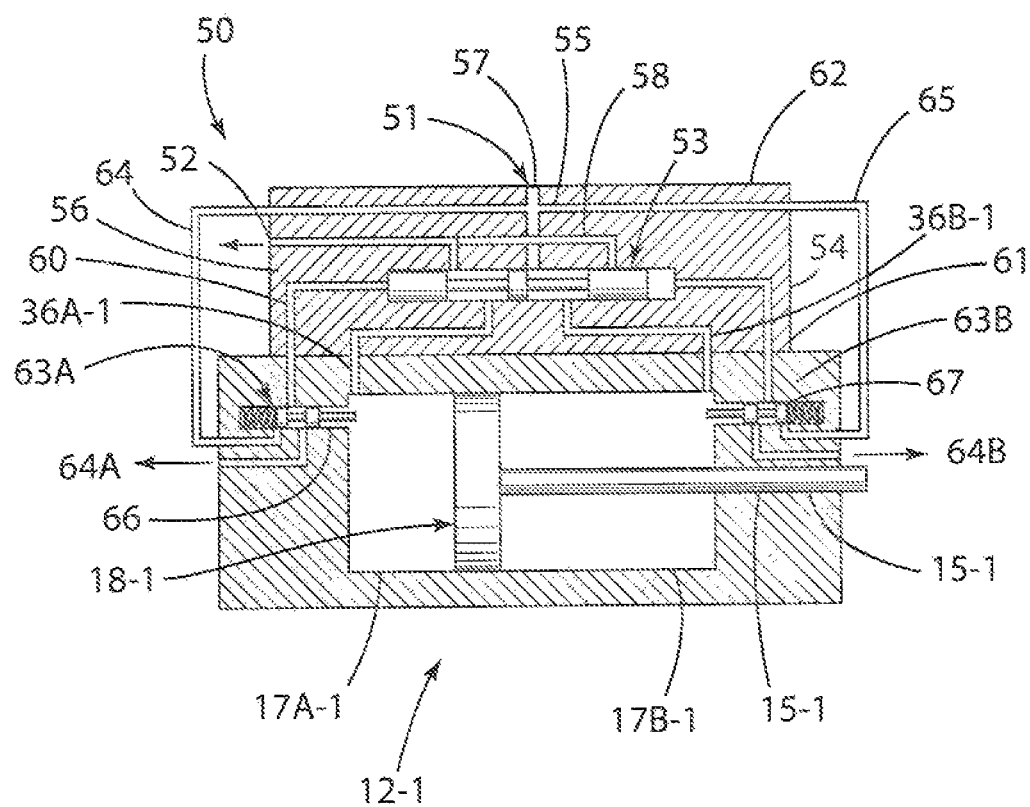
FIG. 3 illustrates a drive cylinder being driving by a pneumatic four-way valve in a first operative condition of a known system.
Figure 4:
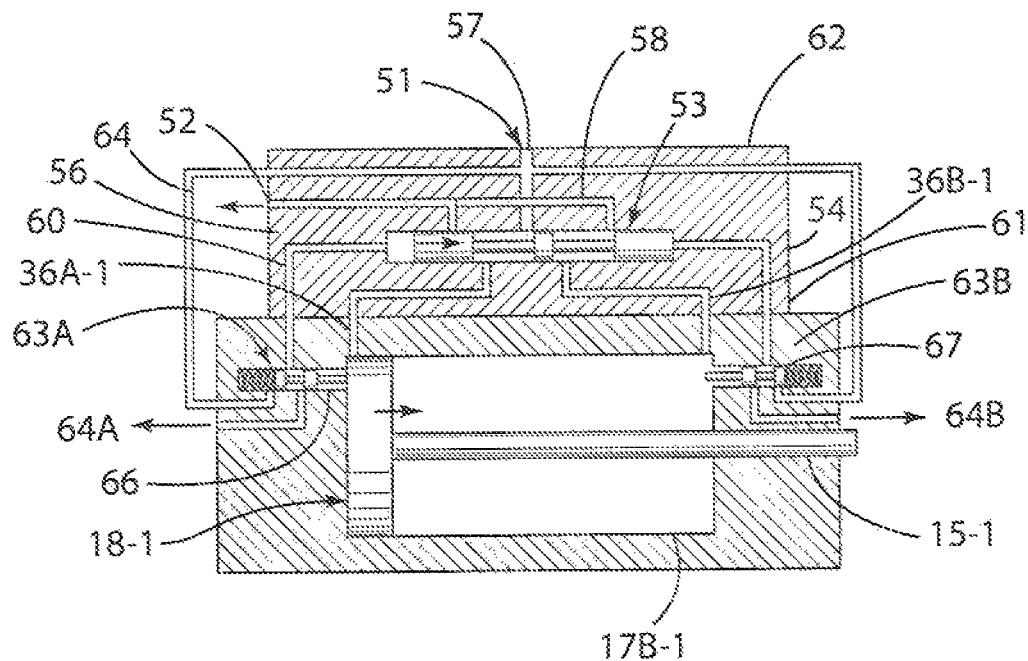
FIG. 4 illustrates a second operative condition of the drive cylinder of FIG. 3.
Figure 5:
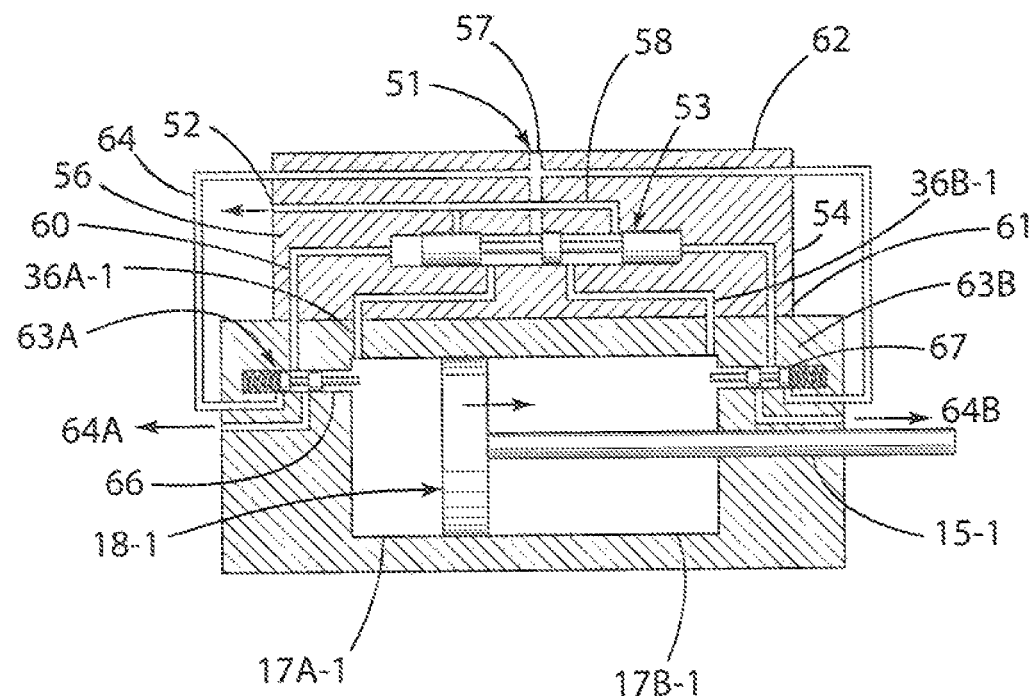
FIG. 5 illustrates a next operative condition of the drive cylinder of FIG. 4.

Turning to the known system shown in FIGS. 3-5, this system uses a pneumatic 4-way valve unit 50 to control reciprocating operation of the drive cylinder 12-1 wherein similar system components are referenced relative to FIGS. 3-5 with common reference numerals denoted by the suffix "-1". Therefore, the drive cylinder 12-1 includes the drive piston 18-1 which drives a piston rod 15-1 to in turn drive a boost cylinder (not shown). The drive cylinder 12-1 includes chambers 17A-1 and 17B-1 which are alternatingly pressurized to reciprocate the piston 18-1.

Generally, a known drive cylinder 12-1 is driven by the 4-way valve unit 50 which includes a drive air supply 51 and a drive air exhaust 52 that are respectively connected to a 4-way valve 53 in a valve manifold 54 by an inlet line 55 and a discharge line 56. The inlet line 54 has a single connection to the valve 53 while the discharge line 55 splits into two outlet ports 57 and 58 that separately connect to the valve 53.

The valve 53 is also connected to a first supply line 36A-1 and second supply line 36B-1 which respectively connect to the cylinder chambers 17A-1 and 17A-2. In the first operative position of the valve 53 shown in FIG. 3, the inlet line 57 is operatively connected to the supply line 36B-1 which pressurizes chamber 17B-1 and drives the piston 18-1 leftwardly. The other chamber 17A-1 is vented by the connection of supply line 36A-1 to the discharge line 56 through the valve port 57 and the valve 53.

To control the operation of the valve 53, the opposite ends of the valve 53 are connected to first and second control lines 60 and 61 which are alternately pressurizable to move the reciprocating valve member 62 leftward and rightward between the two positions seen in FIGS. 3 and 5. The control lines 60 and 61 connect to pilot valve A 63A and pilot valve B 63B which in turn connect to the air supply 57 by supply lines 64 and 65. The pilot valves 63A and 63B are switched between open and closed positions upon physical contact with the piston 18-1 and spring-biased pilot valve members 66 and 67. Each of the pilot valves 63A and 63B vent through breather vents 64A and 64B, which occurs when the piston 18-1 separates from the valve members 66 and 67 as seen in FIG. 3. This condition allows the reciprocating valve body 62 of the 4-way valve to remain in one end position or the other as seen in FIG. 3.

During cylinder operation, the drive piston 18-1 continues moving leftward as seen in FIG. 3 until its stroke bottoms out against the cylinder end wall as seen in FIG. 4. The drive piston 18-1 then actuates the pilot valve 63A by contacting the drive member 66 which opens the pilot valve 63A and allows intake air to pass from line 64 to supply line 60 which then pressurizes the left side of 4-way valve 53 to move the drive member 62 rightwardly (FIG. 4). This closes discharge port 57 and connects the air inlet line 55 with the supply line 36A-1 to start movement of the drive piston 18-1 rightwardly. The discharge line 56 connects to the other supply 36B-1 by opening of the valve port 58.

As the piston 18-1 leaves the left end stroke position of FIG. 3, the piston 18-1 separates from the pilot valve member 66 as seen in FIG. 5 which closes the pilot valve 63A but opens the breather vent 64A to release the air from supply line 60. This occurs after the 4-way valve member 62 has moved to its rightward position of FIGS. 4 and 5. FIG. 5 illustrates the fluid paths as the piston 18-1 moves toward its rightmost stroke position, wherein the piston 18-1 would contact the pilot valve body 67 to again switch the 4-way valve 53 and move its valve member 62 back to the leftmost position of FIG. 3. Essentially, the pilot valve 63B would then operate in the same manner as the pilot valve 63A described above. The 4-way valve 53 and the pilot valves 63A and 63B then repeat this operation to reciprocate the piston 18-1 in opposite leftward and rightward directions to then operate a boost cylinder.

This known configuration of FIGS. 3-5, however, can encounter operational difficulties. In one error condition, the 4-way valve 53 may stall, for example, when a pump or compressor is not used for extended periods and there may be insufficient lubrication for the 4-way valve member 62 which causes hang up or a resistance to movement thereof. Also, it is possible that the pilot valves 63A and 63B may not operate properly which could be related to manufacturing and assembly-related deficiencies or if the valve springs are not in conformance to specifications.

Figure 6:
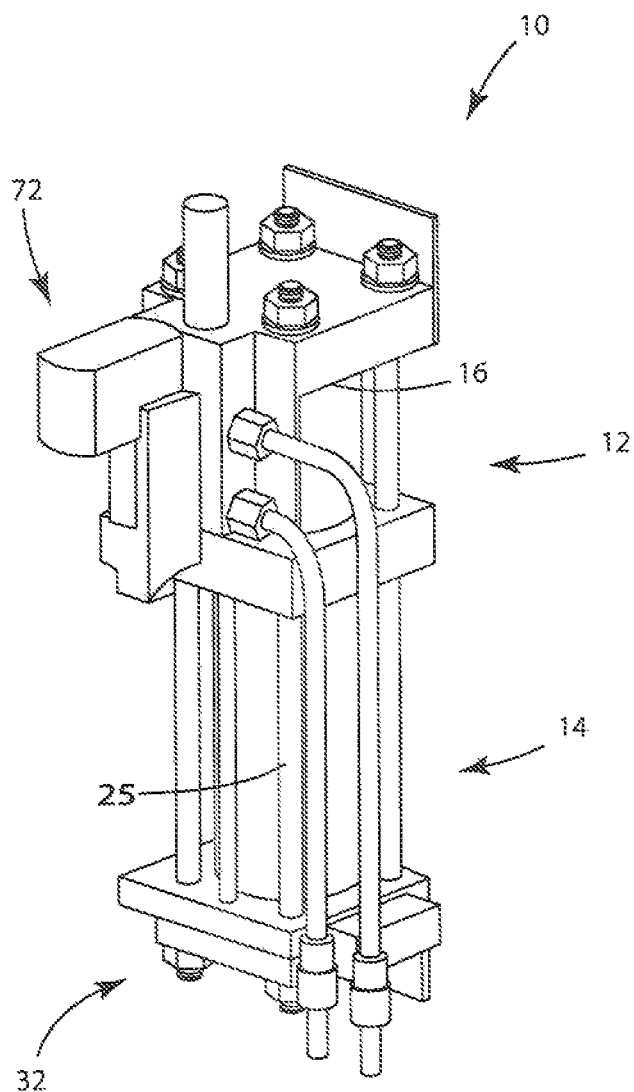
FIG. 6 illustrates an intensifier of the invention.
Figure 7:
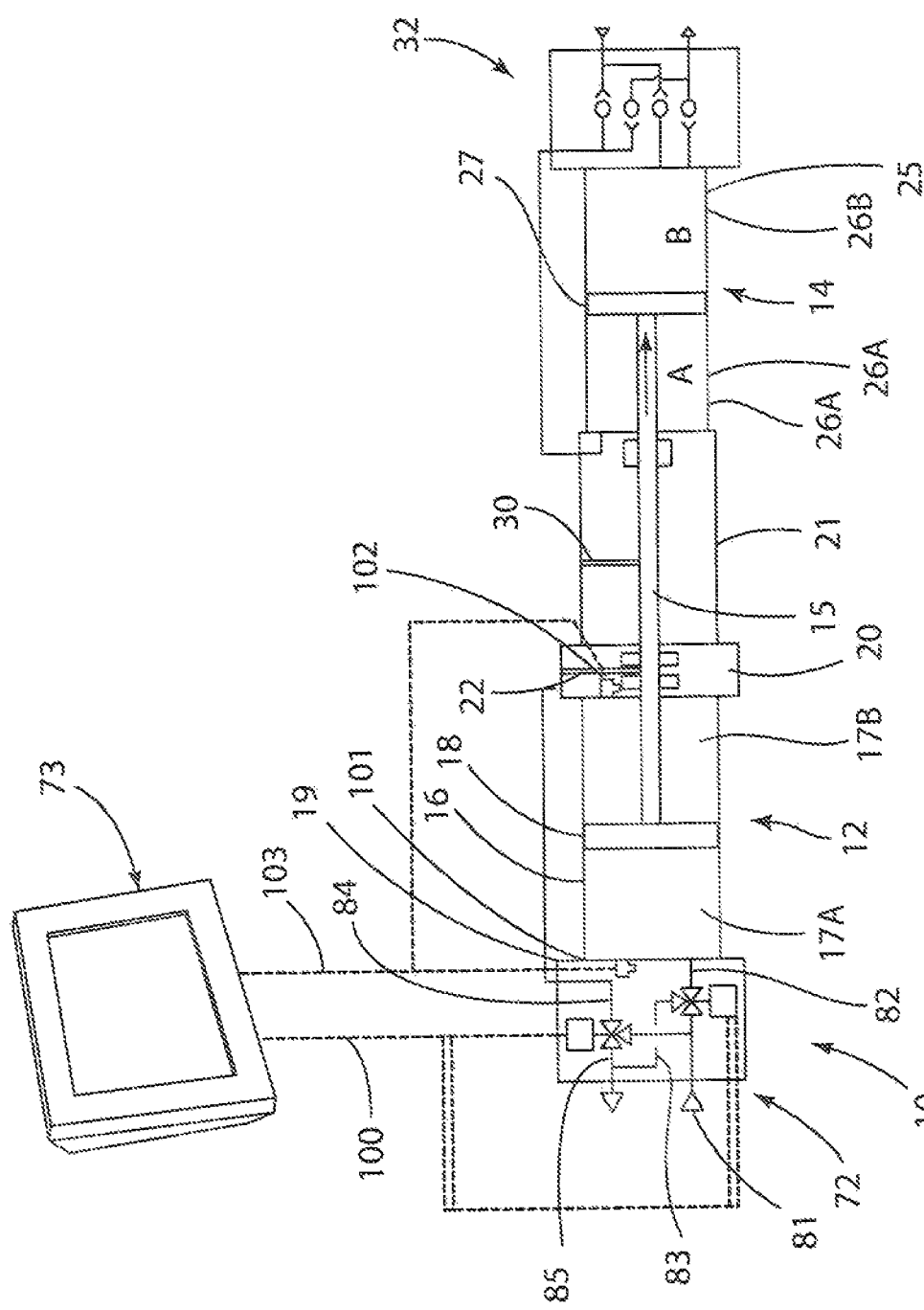
FIG. 7 diagrammatically illustrates the intensifier and the control system thereof.
Figure 8:
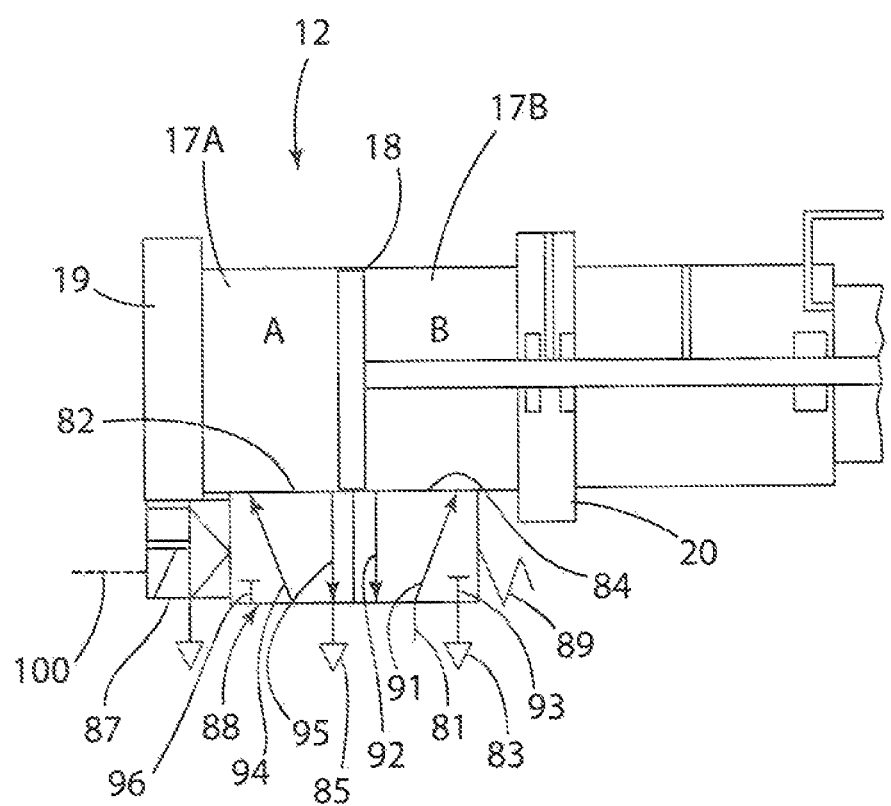
FIG. 8 is an enlarged view of the drive cylinder of the invention.

Referring to FIGS. 6-8, an improved intensifier 10 is disclosed which includes the cylinder arrangement of FIGS. 1 and 2. Referring to FIGS. 6 and 7, this intensifier 10 includes the drive cylinder 12 and the boost cylinder 14 which have pistons 18 and 27 reciprocating within their respective cylinder housings 16 and 25 and which are connected together as described above by the piston rod 15.

Flow of a dry gas through the boost cylinder 14 is controlled by the valve system 32. Hence, the boost piston 27 varies the volumes of the cylinder chambers 26A and 26B as the piston 27 is driven by the drive cylinder 12. To operate the drive cylinder 12, a 5/2 way control valve unit 72 is mounted to drive cylinder 12 and is operated by a controller 73 (FIG. 7). Preferably, the controller 73 is a computer-based microprocessor such as a PLC which allows the operation of the intensifier 10 to be programmed and selectively controlled and monitored.

As to the control valve 72, the control valve 72 preferably is a high speed, fast-acting solenoid valve which has a low power requirement and is suitable for non-lubricated dry air applications. Preferably, the control valve 72 is a 5/2 way valve essentially having five ports or connections. In this regard, the valve includes connection 81 which connects to the source of pressurized air for the drive cylinder 12. The valve 72 also has outlet connections or ports 82 and 84 which respectively connect to supply lines that in turn are connected to the cylinder chambers 17A and 17B.

Also, the control valve 72 includes exhaust ports 83 and 85 which alternatingly exhaust pressurized air from the control valve 72 and the cylinder chambers 17A and 17B during operation of the drive cylinder 12. FIGS. 7 and 8 diagrammatically represent the valve structure, wherein FIG. 8 shows a solenoid control 87 which is selectively operated to move a valve spool 88 between two operative positions. The control valve 72 has a return spring 89 wherein the solenoid 88 is actuated to drive the valve spool 88 from an initial first operative position to the right to a second operative position. When the solenoid is deactivated by the controller 73, the spring 89 biases the valve spool 88 to the left to the original first position, so that the valve 72 switches between the first and second operative positions to cycle or reciprocate the drive piston 18 leftwardly and rightwardly as described above.

As seen in FIG. 8, the control valve 73 is configured to define multiple flow paths diagrammatically shown in FIG. 8. When the spool 88 is in one operative position, a flow path 91 is connected between the intake 81 and the outlet port 84 which is connected to the cylinder chamber 17B. This supplies the pressurized drive air to the chamber 17B and drives the piston 18 leftwardly. The control valve 73 also defines a second flow path 92 which is connected with the port 82 and connected with the discharge port 85. Since the port 82 is connected to cylinder chamber 17A, this allows the chamber 17A to exhaust or depressurize the air from this chamber 17A during the leftward movement of the piston 18. Notably, the other exhaust port 83 is blocked as indicated by symbol 93.

As the piston 18 reaches its leftward end or limit of the leftward drive stroke, the controller 73 signals the control valve 73 to switch to the other operative position of the spool 88 which then reverses the operation of the drive cylinder 12 and causes the piston 18 to reverse stroke and move rightwardly. More particularly, when the spool 88 is in the other operative position, a flow path 94 is connected between the intake 81 and the port 82 which port 82 is connected to the cylinder chamber 17A. This supplies the pressurized drive air to the chamber 17A and drives the piston 18 rightwardly. The control valve 73 also defines a second flow path 95 which is connected with the port 84 and connected with the discharge port 83. Since the port 84 is connected to cylinder chamber 17B, this allows the chamber 17B to exhaust or depressurize the air from this chamber 17B during the rightward movement of the piston 18. Notably, the other exhaust port 85 is blocked as indicated by symbol 96.

In this manner, the control valve 72 alternatingly switches between the two operative positions to selectively pressurize and exhaust the cylinder chambers 17A and 17B and thereby reciprocate the drive piston 18 and in turn drive the boost cylinder 14. In this regard, the controller 73 is connected to the control valve 72 by the signal line 100 which is energized to actuate the solenoid 87 and drive the spool 88 to the second operative position which causes the drive piston 18 to move leftwardly. The control system also includes first and/or second feedback sensors 101 and 102 which connect to the controller 73 by sensor lines 103. The feedback sensor(s) serve as proximity sensors which detect the position of the piston 18 as it approaches the end walls 19 and 20. The feedback sensors 101 and 102 can be a variety of proximity sensors such as magnetic positioning sensors, accelerometers, pressure transducers, velocity sensors or vibration sensors which are capable of identifying the approach of the piston 18 towards one end wall 19 or the other end wall 20.

As the piston 18 moves leftward to the end wall 19, the sensor 101 signals the controller 73 and the controller 73 deactivates the solenoid 87, such that the return spring 89 returns the spool 88 to the initial, operative position. As such, drive air is now supplied to the cylinder chamber 17A while the other chamber 17B exhausts which allows the piston 18 to move rightwardly. Again, as the piston 18 reaches the rightward stroke limit, the sensor 102 signals the controller 73 to again actuate the solenoid 87 and switch the control valve 72 to reverse the piston stroke.

These steps are then repeated as long as the controller 73 is instructed to run the booster cylinder 14. The control process also automatically defines the speed of the unit by the controlling the pressurized air and drive cylinder 12. As such, the controller 73 provides a cyclical power signal to the solenoid 87 and receives signals from the feedback sensors 101 and 102 to control the operation of the intensifier 10.

As an alternative to multi-sensor operation, only a single one of the sensors 101 or 102 may be provided wherein the one sensor 101 or 102 detects the proximity of the piston 18 at one end of the piston stroke and then the controller 73 cycles the piston 18 based upon that detection. For example, the one sensor 101 or 102 would detect the piston 18 at the one stroke end and reverse its movement, wherein the controller 73 could operate the piston by timing the cycle of the piston 18. As the piston 18 travels through its stroke, the controller 73 could automatically reverse the piston 18 at the other end of the piston stroke after a set period of time, and then at the one stroke end detected by the sensor 101 or 102, the controller 73 would again reverse the stroke based upon the proximity sensor signal.

The system of the invention provides various advantages over the prior art. For example, the system provides a reliable booster for supplying the buffer gas after long periods of downtime for a compressor or other equipment. Also, the controller 73 is remotely operated and monitored, and is programmable to provide timed, variable duty cycles. The optimized cycle rate reduces drive air consumption to extend the operating life of the entire system.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. An intensifier for a mechanical seal gas supply system comprising:

a drive cylinder which is operatively connected to a boost cylinder by an intermediate piston rod, said drive cylinder having a pressurized cylinder housing which defines a drive pressure chamber subdivided into variable-volume, first and second cylinder chambers by a reciprocating drive piston;

said boost cylinder having a pressurized cylinder housing which defines a boost pressure chamber that is subdivided into variable-volume, third and fourth cylinder chambers by a reciprocating boost piston, a piston rod slidably extending between said drive and boost pistons so that said boost piston is driven by said drive piston, a gas flow valve system being provided to ensure a continuous, pressurized flow of barrier gas during the reciprocating movement of said boost cylinder by said drive cylinder, said gas flow valve system including a gas inlet that receives a pressurized dry gas at a supply gas pressure as the barrier fluid from a gas supply, said gas inlet including supply lines that alternatingly feed said dry gas to said third cylinder chamber and said fourth cylinder chamber wherein said valve system alternatingly controls the feed of said pressurized dry gas to said third and fourth cylinder chambers wherein said dry gas is pressurized by said boost piston to an increased gas pressure, said gas flow valve system also including a gas outlet that discharges said dry gas after increased pressurization by said boost piston as a mechanical seal barrier fluid;

said first and second chambers being alternately pressurized and depressurized by an air source of pressurized air to drive said drive piston through opposite first and second drive strokes in opposite first and second directions and effect a corresponding driving of said boost cylinder, a diametric area of each of said drive and boost pistons differing wherein the area of the drive piston is larger than the area of said boost piston such that air pressure driving the drive cylinder increases an outlet pressure of said pressurized dry gas generated in the boost cylinder and being output from said boost cylinder to said increased gas pressure for supplying a mechanical seal with a continuous pressurized flow of said dry gas as the barrier fluid at said increased gas pressure; and a control valve system to control a flow of said dry gas through said boost cylinder, which comprises a 5/2 way control valve unit having a control valve, said control valve having five ports comprising an inlet port which connects to said air source of said pressurized air that is separate from said gas supply, first and second outlet ports to alternatingly supply said pressurized air to said first and second cylinder chambers and first and second exhaust ports to alternatingly depressurize and exhaust air from said first and second cylinder chambers, said control valve system including an automated, computer-driven controller which selectively opens and closes said ports of said control valve and controls operation of said intensifier in response to operation of said drive cylinder and a position of said drive piston, said control valve including a high speed, fast-acting solenoid valve which is suitable for non-lubricated dry air applications and is actuated by said controller, said solenoid valve comprising a solenoid control having a valve spool which is selectively operated in response to operation of said drive cylinder to move between two operative positions and a solenoid which is actuated by said controller upon detection of the position of said drive piston to drive the valve spool from an initial first operative position to a second operative position, said solenoid control having a return spring wherein the solenoid is actuated by said controller to drive the valve spool from said initial first operative position to said second operative position, and when said solenoid is deactivated by said controller, said return spring biasing said valve spool to the initial first operative position, so that said valve spool switches between the first and second operative positions to reciprocate said drive piston through said first and second drive strokes and reciprocate said boost piston to supply said continuous pressurized flow of said dry gas as a barrier fluid;

said first and second drive strokes being defined by opposite said first and second stroke ends, and said control system including at least a first feedback sensor at said first stroke end which communicates with said controller and serves as a proximity sensor which detects the position of said drive piston as said drive piston approaches said first feedback sensor located at said first stroke end to control said solenoid control, and said feedback sensor detecting the proximity of said drive piston at said first stroke end and said controller reversing the movement of said drive piston upon detecting said drive piston moving through said second piston stroke, said controller being programmed to selectively control and operate said drive piston by reversing the cycle of said drive piston as the drive piston travels through said first drive stroke based upon one of detecting the proximity of said drive piston at said second stroke end by a second feedback sensor or timing a set period of time during which said piston stroke moves through said first piston stroke, the controller automatically reversing said drive piston at said second stroke end after detection by said second proximity sensor or after said set period of time, and then at said first stroke end detected by said first proximity sensor, the controller again reversing the stroke based upon the proximity sensor signal.

2. The intensifier according to claim 1, wherein said control valve defines multiple flow paths wherein, when said valve spool is in said first operative position, a first flow path is connected between said inlet port and the first outlet port which is connected to the first cylinder chamber which supplies the pressurized drive air to the first cylinder chamber and drives the drive piston through said first drive stroke in the first direction, said control valve also defining a second flow path which is connected with the second outlet port and connected with the first exhaust port to exhaust the second cylinder chamber when the first cylinder chamber is pressurized by air from said inlet port with said second exhaust port being blocked.

3. The intensifier according to claim 2, wherein, when said valve spool is in said second operative position, a third flow path is connected between said inlet port and the second outlet port which is connected to the second cylinder chamber which supplies the pressurized drive air to the second cylinder chamber and drives the drive piston through said second drive stroke in the second direction, said control valve also defining a fourth flow path which is connected with the first outlet port and connected with the second exhaust port to exhaust the first cylinder chamber when the second cylinder chamber is pressurized by air from said inlet port with said first exhaust port being blocked.

4. The intensifier according to claim 3, wherein said controller signals said control valve to switch said valve spool to the second operative position as said drive piston reaches an end limit of said first drive stroke in said first direction, which then reverses the operation of the drive piston and causes said drive piston to reverse stroke and move through said second drive stroke in said second direction.

5. The intensifier according to claim 4, wherein when said valve spool is in said first operative position, said first flow path is connected between said inlet port and said first outlet port which is connected to said first cylinder chamber to supply the pressurized drive air to the first cylinder chamber and drives said drive piston through said first drive stroke, said second flow path being connected with the second outlet port and said first exhaust port which allows said second cylinder chamber to exhaust air during piston movement through said first drive stroke.

6. The intensifier according to claim 5, wherein said controller is a computer-based microprocessor which allows the operation of said intensifier to be programmed and selectively controlled and monitored through said controller.

7. The intensifier according to claim 6, wherein said proximity sensors are one of magnetic positioning sensors, accelerometers, pressure transducers, velocity sensors or vibration sensors which are capable of identifying the approach said drive piston.

8. The intensifier according to claim 6, wherein only a single one of the proximity sensors is provided wherein the one sensor detects the proximity of said drive piston at said first stroke end during said second drive stroke and then the controller cycles the drive piston based upon that detection.

9. The intensifier according to claim 1, wherein said controller is a computer-based microprocessor which allows the operation of said intensifier to be programmed and selectively controlled and monitored through said controller.

10. The intensifier according to claim 1, wherein said drive cylinder is interconnected to said boost cylinder by a spacer-like distance piece between a drive cylinder end wall and a boost cylinder end wall, said piston rod extending through said distance piece and said intensifier having an air vent proximate said drive cylinder for venting air leaking along said piston rod from said drive cylinder and a gas vent for venting gas leaking along said piston rod from said boost cylinder so as to prevent mixing of said air and said gas.

* * * * *